United States Patent
Alarcon et al.

(10) Patent No.: US 12,170,945 B2
(45) Date of Patent: Dec. 17, 2024

(54) METHOD AND DEVICE FOR PROTECTING A LOCAL AREA NETWORK COMPRISING A NETWORK SWITCH TO WHICH A STATION IS CONNECTED BY CABLE CONNECTION

(71) Applicant: SAGEMCOM BROADBAND SAS, Rueil Malmaison (FR)

(72) Inventors: Laurent Alarcon, Rueil Malmaison (FR); Sylvain Le Roux, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 47 days.

(21) Appl. No.: 17/852,048

(22) Filed: Jun. 28, 2022

(65) Prior Publication Data
US 2022/0417831 A1 Dec. 29, 2022

(30) Foreign Application Priority Data

Jun. 28, 2021 (FR) ...................................... 2106933

(51) Int. Cl.
*H04W 40/24* (2009.01)
*H04W 12/03* (2021.01)
(Continued)

(52) U.S. Cl.
CPC ......... *H04W 40/248* (2013.01); *H04W 12/03* (2021.01); *H04W 84/12* (2013.01); *H04W 88/16* (2013.01)

(58) Field of Classification Search
None
See application file for complete search history.

(56) References Cited

U.S. PATENT DOCUMENTS

| 11,432,138 | B1 * | 8/2022 | Jiang | H04L 63/062 |
| 2017/0272273 | A1 * | 9/2017 | Singla | H04W 76/12 |

(Continued)

FOREIGN PATENT DOCUMENTS

| FR | 3 100 408 A1 | 3/2021 |
| FR | 3 102 332 A1 | 4/2021 |
| FR | 3 105 701 A1 | 6/2021 |

OTHER PUBLICATIONS

Mar. 14, 2022 Search Report issued in French Patent Application No. 2106933.

*Primary Examiner* — Brian S Roberts
(74) *Attorney, Agent, or Firm* — Williams Mullen; R. Brian Drozd (57) ABSTRACT

A method and device for protecting a local area network including nodes allowing an extension of wireless communication coverage in order to increase the range of the local area network by coordinating a plurality of access points integrated in the nodes, the nodes being interconnected by a backhaul subnetwork, each node in the backhaul subnetwork transmitting at least one wireless network referred to as a fronthaul network, the method includes the steps of: detecting a connection of a station by a cable connection to a network switch included in the local area network, the network switch being connected to the backhaul subnetwork by a cable connection, establishing secure connections between each node if the connection of the station by a cable connection to the network switch is detected, managing the nodes of the network connected to the network switch with filtering rules applied to the data received by the nodes.

9 Claims, 6 Drawing Sheets

(51) Int. Cl.
*H04W 84/12* (2009.01)
*H04W 88/16* (2009.01)

(56) References Cited

U.S. PATENT DOCUMENTS

2021/0068032 A1* 3/2021 Colliaux ............... H04W 40/22
2021/0195516 A1* 6/2021 Lalam ................... H04W 88/14
2022/0361261 A1* 11/2022 Jaulin ................. H04L 61/4511

* cited by examiner

Fig. 2 ebtables I FORWARD -d @STA6 -i tap2c -j ACCEPT
ebtables I FORWARD -s @STA6 -o tap2c -j ACCEPT
ebtables I INPUT -s @STA6 -p 0x800 --ip-proto udp --ip-dport 67:68 -j ACCEPT
ebtables I OUTPUT -d @STA6 -p 0x800 --ip-proto udp --ip-dport 67:68 -j ACCEPT
ebtables I INPUT -s @STA6 -p 0x86dd --ip6-proto udp --ip6-dport 546:547 -j ACCEPT
ebtables I OUTPUT -d @STA6 -p 0x86dd --ip6-proto udp --ip6-dport 546:547 -j ACCEPT
ebtables I INPUT -s @STA6 -p 0x86dd --ip6-proto udp --ip6-dport 53 -j ACCEPT
ebtables I OUTPUT -d @STA6 -p 0x86dd --ip6-proto udp --ip6-dport 53 -j ACCEPT
ebtables I INPUT -s @STA6 -p 0x86dd --ip6-proto tcp --ip6-dport 53 -j ACCEPT
ebtables I OUTPUT -d @STA6 -p 0x86dd --ip6-proto tcp --ip6-dport 53 -j ACCEPT

Fig. 3a ebtables -A FORWARD -s @STA6 -j DROP
ebtables -A FORWARD -d @STA6 -j DROP
iptables -t filter -I FORWARD -m mac --mac-source @STA6 -o ext1togw -j ACCEPT
iptables -t filter -I FORWARD -m state --state ESTABLISHED,RELATED -i ext1togw -j ACCEPT
iptables -t filter -A FORWARD -m mac --mac-source @STA6 -j DROP
iptables -t filter -A INPUT -m mac --mac-source @STA6 -j DROP

Fig. 3b ebtables -I INPUT -s @STA4 -j ACCEPT ebtables -I OUTPUT -d @STA4 -j ACCEPT ebtables -I FORWARD -s @STA4 -j ACCEPT ebtables -I FORWARD -d @STA4 -j ACCEPT ebtables -I FORWARD -s @STA4 -o tap1s -j DROP ebtables -I FORWARD -d @STA4 -o tap1s -j DROP

Fig. 4a ebtables -I INPUT -s @STA4 -j ACCEPT ebtables -I OUTPUT -d @STA4 -j ACCEPT ebtables -I FORWARD -s @STA4 -j ACCEPT ebtables -I FORWARD -d @STA4 -j ACCEPT ebtables -I FORWARD -d @STA4 -o tap2c -j DROP ebtables -I FORWARD -s @STA4 -o tap2c -j DROP

Fig. 4b ebtables -I INPUT -s 6a:86:57:71:be:86 -j ACCEPT ebtables -I OUTPUT -d 6a:86:57:71:be:86 -j ACCEPT

METHOD AND DEVICE FOR PROTECTING A LOCAL AREA NETWORK COMPRISING A NETWORK SWITCH TO WHICH A STATION IS CONNECTED BY CABLE CONNECTION

TECHNICAL FIELD

The present invention relates to a method and a device for protecting a local area network comprising nodes allowing an extension of coverage of wireless communication in order to increase the range of the local area network by coordinating a plurality of access points integrated in the nodes.

PRIOR ART

In local area networks LAN, systems for extending coverage of wireless communication can be used in order to increase the range of these local area networks LAN by coordinating a plurality of distributed access points AP. These various access points AP are integrated in communication nodes, simply referred to hereinafter as nodes, interconnected by means of a backhaul subnetwork and all making available one and the same wireless local area network WLAN.

The nodes of the backhaul subnetwork are connected to one another by means of a structure in tree form, a node then being able to serve as a relay between two other nodes of the backhaul subnetwork. The nodes of the backhaul subnetwork are thus interconnected by means of cable connections, for example of the Ethernet type, or wireless connections. The nodes of the backhaul subnetwork are connected together by a network that is also referred to as a backhaul network that can be either cable, or wireless, or a combination of the two.

Each node of the backhaul network sends to at least one wireless network that is called "fronthaul network", to which the stations of the user are connected. This fronthaul network, if it uses Wi-Fi/IEEE 802.11 technology, is the equivalent of what is termed BSS (Basic Service Set).

At least one of the nodes of the backhaul subnetwork is connected to a residential gateway that provides access to the internet. The residential gateway may also form part of the backhaul subnetwork.

Wi-Fi network natively provides the security of the data exchanged by using an encryption technology. A secret shared by two nodes of the backhaul subnetwork makes it possible, at the moment of the Wi-Fi association of a station, to protect the data as soon as the station is connected to the wireless network.

The same does not apply when a station connects to the backhaul network by means of a network switch using a cable connection.

The protection of the connection of the station by means of a cable connection must be implemented by a top network layer. The connection is initially established without encryption and the connected items of equipment can, if they so wish, establish a secure connection by using for example the SSL protocol or by creating a virtual private network.

Currently, backhaul subnetwork connections in Ethernet are not in general protected and the use of a network switch in the local area network creates security problems. This is because, if the backhaul subnetwork is not encrypted, the network switch makes it possible to spy on all the traffic of the backhaul subnetwork and, if the backhaul subnetwork is encrypted, it would no longer enable a station to be connected to the local area network.

The proposed present invention makes it possible to remedy the problem of security related to the use of a network switch connected to the backhaul subnetwork by means of a cable connection of the Ethernet type.

DISCLOSURE OF THE INVENTION

For this purpose, according to a first aspect, the invention proposes a method for protecting a local area network comprising nodes allowing an extension of coverage of wireless communication in order to increase the range of the local area network by coordinating a plurality of access points integrated in the nodes, the nodes being interconnected by means of a backhaul subnetwork, each node of the backhaul subnetwork sending to at least one wireless network, called fronthaul network, characterised in that the method comprises the steps of:
   detecting the connection of a station by means of a cable connection to a network switch, said network switch being connected to the backhaul subnetwork by a cable connection,
   establishing secure connections between each node if the connection of the station by means of a cable connection to the network switch is detected,
   managing the nodes of the network connected to the network switch with filtering rules applied to the data received by the nodes.

The invention also relates to a device for protecting a local area network comprising nodes allowing an extension of coverage of wireless communication in order to increase the range of the local area network by coordinating a plurality of access points integrated in the nodes, the nodes being interconnected by means of a backhaul subnetwork, each node of the backhaul subnetwork sending to at least one wireless network, called fronthaul network, characterised in that the device comprises:
   means for detecting the connection of a station by means of a cable connection to a network switch, said network switch being connected to the backhaul subnetwork by a cable connection,
   means for establishing secure connections between each node if the connection of the station by means of a cable connection to the network switch is detected,
   means for managing the nodes of the network connected to the network switch with filtering rules applied to the data received by the nodes.

Thus the present invention makes it possible to remedy the problem of security relating to the use of a network switch connected to the backhaul subnetwork by means of a cable connection of the Ethernet type.

According to a particular embodiment of the invention, prior to the establishment of secure connections, the method comprises a step of detecting, by a node, information indicating that at least one node of the local area network has the coverage extension functionality.

According to a particular embodiment of the invention, the local area network further comprises a gateway allowing access to the internet and, prior to the establishment of the secure connections, a permanent IP connection is established, the permanent IP connection being different from that used by the gateway.

According to a particular embodiment of the invention, if at least two nodes are directly connected to the gateway and the gateway does not implement a master-election mechanism for attributing an IP address, the two nodes send requests for attributing an IP address by inserting in a field predetermined information known to the other nodes, the nodes relaying the requests while suppressing the field information.

According to a particular embodiment of the invention, a secure connection is established between each pair of nodes, the nodes in each pair of nodes generating encryption parameters for the secure communication.

According to a particular embodiment of the invention, the method comprises the step of suppressing each loop formed by the creation of a secure connection between two nodes and the connection previously used in the backhaul subnetwork between the two nodes.

According to a particular embodiment of the invention, the filtering rules applied to the data received by the nodes are applied for enabling the station connected to the network switch by means of the cable connection to access solely the internet by means of the gateway or to access the whole of the local area network.

The present invention also relates to a computer program product. It comprises instructions for implementing, by a node device, the method according to one of the preceding embodiments, when said program is executed by a processor of the node device.

The present invention also relates to a storage medium. It stores a computer program comprising instructions for implementing, by a node device, the method according to one of the preceding embodiments when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1A:
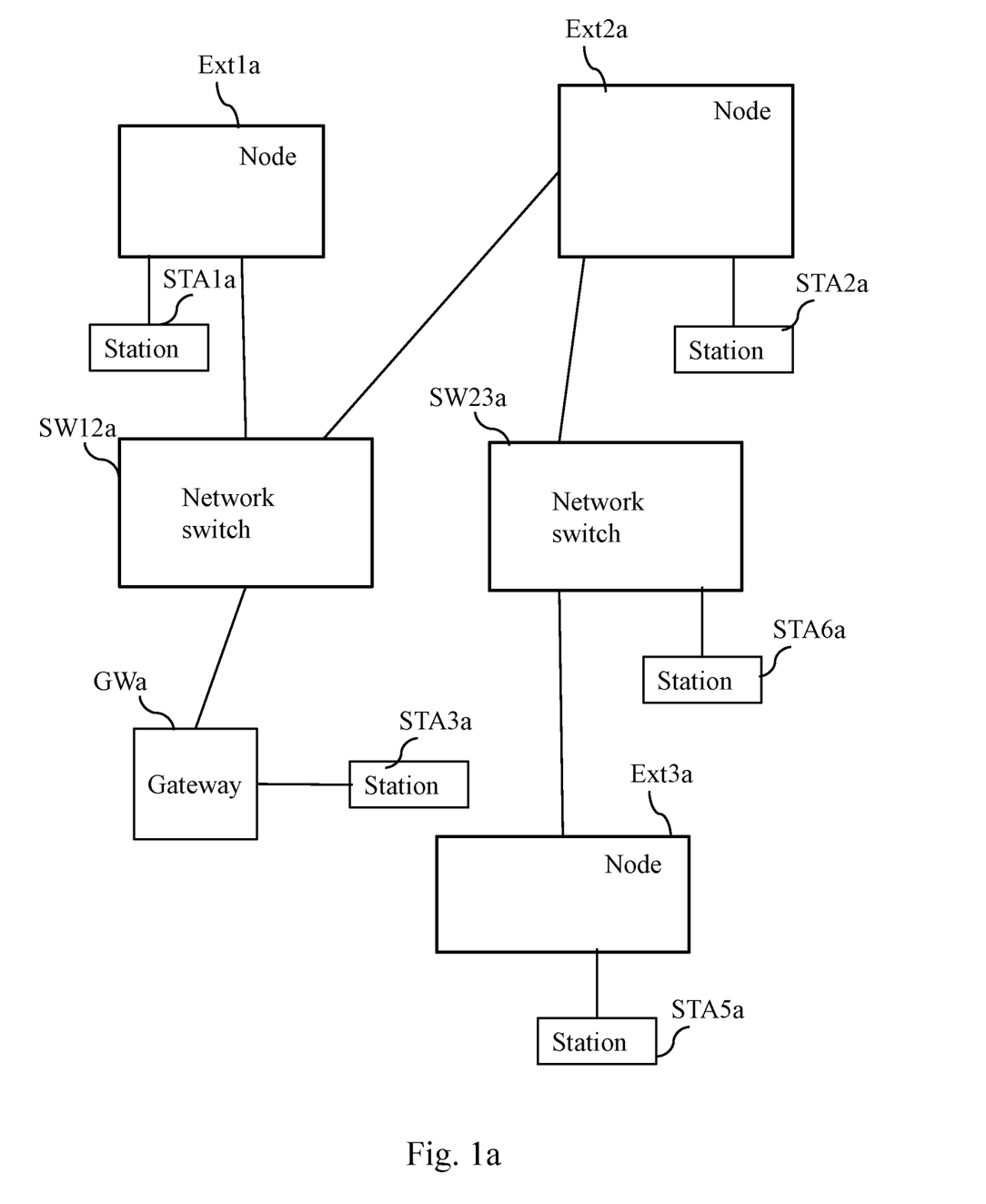
FIG. 1a illustrates schematically a first example of a local area network wherein the present invention is implemented.

FIG. 1a illustrates schematically a first local area network wherein the present invention is implemented.

The local area network is constructed around a backhaul subnetwork comprising a set of interconnected nodes Ext1a, Ext2a and Ext3a. Each node Ext1a, Ext2a and Ext3a of the backhaul subnetwork comprises a plurality of radio interfaces:
- a radio interface known as "AP-BH" (standing for "Access Point Backhaul") corresponding to an access-point interface of the backhaul subnetwork,
- a radio interface "ST-BH" (standing for "Station Backhaul") corresponding to a client interface of the backhaul subnetwork,
- a radio interface "AP-FH" (standing for "Access Point Fronthaul") corresponding to an access-point interface of the local area network, this interface being dedicated to the association of stations or terminals.

In the context of Wi-Fi (registered trade mark) technology, all these access points AP-FH thus use the same SSID identifier and the same password. The coverage area of the local area network thus formed around the wireless communication coverage extension system is then extended transparently for each terminal, or station, that connects thereto.

The nodes Ext1a, Ext2a and Ext3a of the backhaul subnetwork are connected to one another by means of a structure in tree form, a node then being able to serve as a relay between two other nodes of the backhaul subnetwork. The nodes Ext1a, Ext2a and Ext3a are thus interconnected by means of cable connections, for example of the Ethernet type, or wireless connections. The nodes Ext1a, Ext2a and Ext3a of the backhaul subnetwork thus communicate with each other by means of logic connections, for example IP communications or encrypted tunnels or communications in accordance with a proprietary communication protocol. These logic connections are established typically by means of probe and discovery messages.

By way of illustration, FIG. 1a shows that the node Ext1a is connected to a network switch SW12a, the node EXT2a is connected to a switch SW23a and to the switch SW12a, the node Ext3a is connected to the network switch SW23a, the network switch SW12a is connected to a gateway GW1a for access to the internet.

A station STA1a is connected to the radio access point interface of the node Ext1a, a station STA2a is connected to the radio access point interface of the node Ext2a, a station STA3a is connected to the radio access point interface of the gateway GWa, a station STA6a is connected by a cable connection of the Ethernet type to the network switch SW23a, and a station STA5a is connected to the radio access point interface of the node Ext3a.

The wireless communication coverage extension system enables the stations STA1a, STA2a, STA3a, STA5a and STA6a to access the internet by means of the gateway GWa.

The stations are for example smartphones or a tablet, a computer, a television set, a network storage unit NAS ("Network Attached Storage").

The nodes of the backhaul subnetwork know the topology of the backhaul subnetwork and of the local area network by virtue of the analysis of the information that they have available locally and the messages relating to the topology of the network that they receive from the other nodes.

Generally, the nodes use a bridge for connecting together the various interfaces of the backhaul and fronthaul networks. The bridge has an association table between each MAC address of an item of equipment and the physical interface or port to which the equipment is connected. All the items of equipment connected to the fronthaul interface of an access point are known.

In FIG. 1a, the station STA6a is not associated with a fronthaul interface. However, in the case of the station ST6a, the station STA6a being announced by the nodes Ext2a and Ext3a connected to the network switch SW23a as being seen on one of their backhaul interfaces, the nodes Ext2a and Ext3a can deduce therefrom the presence of a network switch between them as soon as the station ST6a transmits data.

Each node Ext1a to Ext3a can indicate its wireless communication coverage extension functionality in options included in a DHCP (the acronym for Dynamic Host Configuration Protocol) request. When an Ethernet cable connected to a port of the network switch SW23a is detected, the corresponding Ethernet interface is activated in the network switch SW23a. As long as a DHCP request with the option making it possible to identify the coverage extension functionality is not received, the Ethernet port can receive non-encrypted traffic coming from a station connected to the fronthaul. All the management traffic of the backhaul sub-network is filtered on this port. This makes it possible to avoid broadcasting information in an unsecure manner to the station STA6a. As soon as a DHCP request with the option for identifying the coverage extension functionality is received, a secure connection, called a tunnel, is established. In order to simplify the establishment of the tunnel, it is desirable to establish a permanent IP connection between the nodes Ext1a to Ext3a, independently of the presence of the gateway GWa. For example, a virtual local area network VLAN is created by each node, configured on a network different from the one used by the gateway GW, by means of a DHCP server hosted by one of the nodes Ext1a, Ext2a or Ext3a, which is considered to be the master, and client DHCPs started up on each other node considered to be a slave, or in accordance with the protocol as defined in RFC 3927: Dynamic Configuration of IPv4 Link-Local Addresses.

For establishing the secure connection, encryption parameters are necessary. The generation and storage of the encryption parameters are triggered at the time of the association, or of the first communication of a node Ext1a to Ext3a, with the local area network. Encryption information is generated for each pair of nodes, identified for example by their serial number. Thus a node can easily determine, by means of the serial number contained in a DHCP request, whether encryption information has already been generated between the node that sent the DHCP request and itself. The node that receives the DHCP request is at the initiative of the phase of generating the encryption parameters.

For example, in the case of use of a tunnel of the OpenVPN type, an open source VPN protocol that uses TLS/SSL (Secure Socket Layer) for establishing encrypted and authenticated internet connections between two machines, the SSL protocol relies on the use of asymmetric encryption keys. The two asymmetric keys offer the property that a message encrypted by one of the keys in the pair can be deciphered only by the second key in the pair, and vice versa. In addition, certificates are issued by certification authorities, and link the public key, the identity of the certification authority and the identity of the issuer of the public key.

Thus each node can start up a VPN server using its private key, an associated certificate, a root certificate that was used for encrypting it and its key. It can thus be client or server of an OpenVPN secure link with all the other nodes in the network.

The master node is for example determined as follows. The nodes, when they are added to the local area network, send a DHCP message such as DHCP DISCOVER and DHCP REQUEST, and indicate their coverage extension functionality and that they support the mechanism for electing the master node as well as the IP address of their VLAN.

If the gateway GWa does not implement the mechanism for electing the master node, when the gateway GWa receives the DHCP message, the gateway GWa ignores the coverage extension functionality without inserting in its DHCP OFFER and DHCP ACK responses the option indicating that it implements the coverage extension functionality. The newly added node thus knows that the gateway GWa does not support this election mechanism and starts up a DHCP relay mechanism in order to allow use thereof in the case of subsequent connection of other nodes. When another node is added to the local area network, the latter sends a DHCP message such as DHCP DISCOVER or DHCP REQUEST, which indicates its coverage extension functionality. The message is relayed by the previously added node to a DHCP server, which inserts in its response the option for identifying the coverage extension functionality, and starts up its tunnel server.

If the gateway GWa implements the mechanism for electing the master node, the message is received by the gateway GWa, which then inserts in the response information indicating its coverage extension functionality, activates its tunnel server and inserts, in a private option of the message, the IP address of its VLAN.

In the previously cited cases, if information indicating the coverage extension functionality is present, the node extracts, from the response, the IP address of the VLAN present in a private option of the message and starts up its client to establish a tunnel with the server having this IP address.

When at least two nodes are directly connected to a gateway GWa that does not implement the mechanism for electing the master node, they use an option in the DHCP packet located in the interval 224 to 254 reserved for a "private use". By sending in the DHCP requests an option 224 containing a predetermined value known to all the nodes, a node can identify another node having the coverage extension functionality as being the source of the request. The DHCP relay servers present on the nodes intercept the requests and change the content of the option. Thus, by modifying the content of the option 224 when the DHCP DISCOVER or REQUEST packets are relayed, a node can determine the presence of another node between it and the node that sent the DHCP request and activate its tunnel server.

It should be noted here that, alternatively to the DHCP, this discovery principle can be extended to all the discovery mechanisms such as DHCPv6, ICMPv6 as both defined by RFC 4861 (Neighbours Discovery), etc.

The tunnel is therefore configured on the VLAN using an IP network addressing different from that of the backhaul to guarantee permanent IP connectivity, independently of the various filtering rules that might be inserted. The traffic necessary for the operation of the tunnel does not pass directly through the bridges included in the nodes that do not learn the MAC addresses when the tunnel is established.

On each node at the ends of the tunnel, a virtual interface denoted tap0 is created for sending and receiving the encrypted data. These virtual interfaces are inserted in the backhaul bridge. This will create a loop between the two bridges, which are now connected directly via their backhaul conventional interfaces denoted eth0 and by the virtual interfaces tap0 of the tunnel.

For a tunnel between two nodes, one of which does not have a direct link with the gateway GWa providing access to the internet, the data on the non-protected interface eth0 of the two nodes are not transferred to the backhaul or the fronthaul.

Thus only the data coming from the tunnel are enabled to pass to the backhaul and the fronthaul and to join the local stack, which temporarily stores the data received and transmitted by the node. Likewise, all the data sent by the node must be sent in the tunnel. For a tunnel between two nodes, one of which has a link with the gateway GWa, either directly or via a network switch, the Ethernet interface of the node connected to the gateway GWa will be used for routing the packets from the stations that are connected to it to the gateway GWa for an internet access. A bridge is configured with the same IP address as the one obtained on the Ethernet link and will be used for routing packets to the fronthaul and the backhaul of the node.

One or more nodes that detect a connectivity with the gateway GWa on an Ethernet interface, for example the nodes Ext1a or Ext2a, eliminate the Ethernet interface from its bridge in order to use the bridge in a router function of the local area network, stop the client DHCP on the local area network bridge and create a new bridge directly on the Ethernet interface that was eliminated from the bridge. The IP address obtained is also configured on the local area network bridge, but without adding a route for the local area network in the routing table of the new bridge, which already contains a route making it possible to join the network from the new bridge via an Ethernet interface present on the bridge of the node Ext2a on which a connectivity with Ext1a called ext2tosw12 was detected. This interface allows the sending of data to Ext1a or the reception of data from Ext1a.

The route for joining the network with the IP address obtained via an interface br2 is inserted in an additional routing table. The additional routing table is a new table created for routing the data to the local bridge. The interface br2 is the local bridge of Ext2a created by a bridge management command that makes it possible to relay the data between the interfaces that it manages, to all the interfaces if the packet is broadcast to a broadcast address or to the port making it possible to join the destination MAC address.

In order to correctly route the packets to stations connected to the node, both on the backhaul and on the fronthaul, routing rules are added in order to use the additional routing table for the other node of the tunnel and the stations that are connected to the nodes of the fronthaul and backhaul networks.

The DHCP relay is started up between the local area network bridge and the interface br2 connected to the gateway GW, a DHCP relay is started up between the LAN bridge and the interface br2 connected to the gateway in order to enable the DHCP requests received on the interface br2 to be relayed to the gateway, which can be joined via an interface called ext2tosw12 created for transmitting data to the other node of the tunnel.

The interface Br2 serves to route the data in the backhaul network and ext2osw12 serves to route the data to the gateway GW.

An ARP (the acronym for Address Resolution Protocol) proxy is created so that the node can respond to the ARP requests arriving on the interface ext2tosw12 to resolve the addresses present on the interface br2, and vice versa. Thus, on reception of an ARP request on the interface br2 for example, the ARP proxy will relay the request on the interface ext2tosw12 since this interface has an IP address belonging to the network configured on the interfaces br2 and ext2osw12 and, on reception of the response, will respond positively to the request on the interface br2.

Two filtering rules are also established so that DHCP packets relayed to the gateway GWa are not transmitted to the other node of the tunnel.

In this configuration, the station STA6a connected to a network switch cannot communicate with any other item of equipment, node, station or gateway of the local area network since it is not connected to a tunnel, the transmitted data being filtered.

It is possible to derogate from this rule by enabling the station STA6a to communicate partly or wholly with the equipment of the local area network, either in a predefined manner or by an action of the holder of the local area network by means of a graphical interface.

The nodes will detect the station STA6a as mentioned previously.

For example, the holder of the local area network can enable solely an access to the Internet or enable access to the whole of the local area network.

Figure 1B:
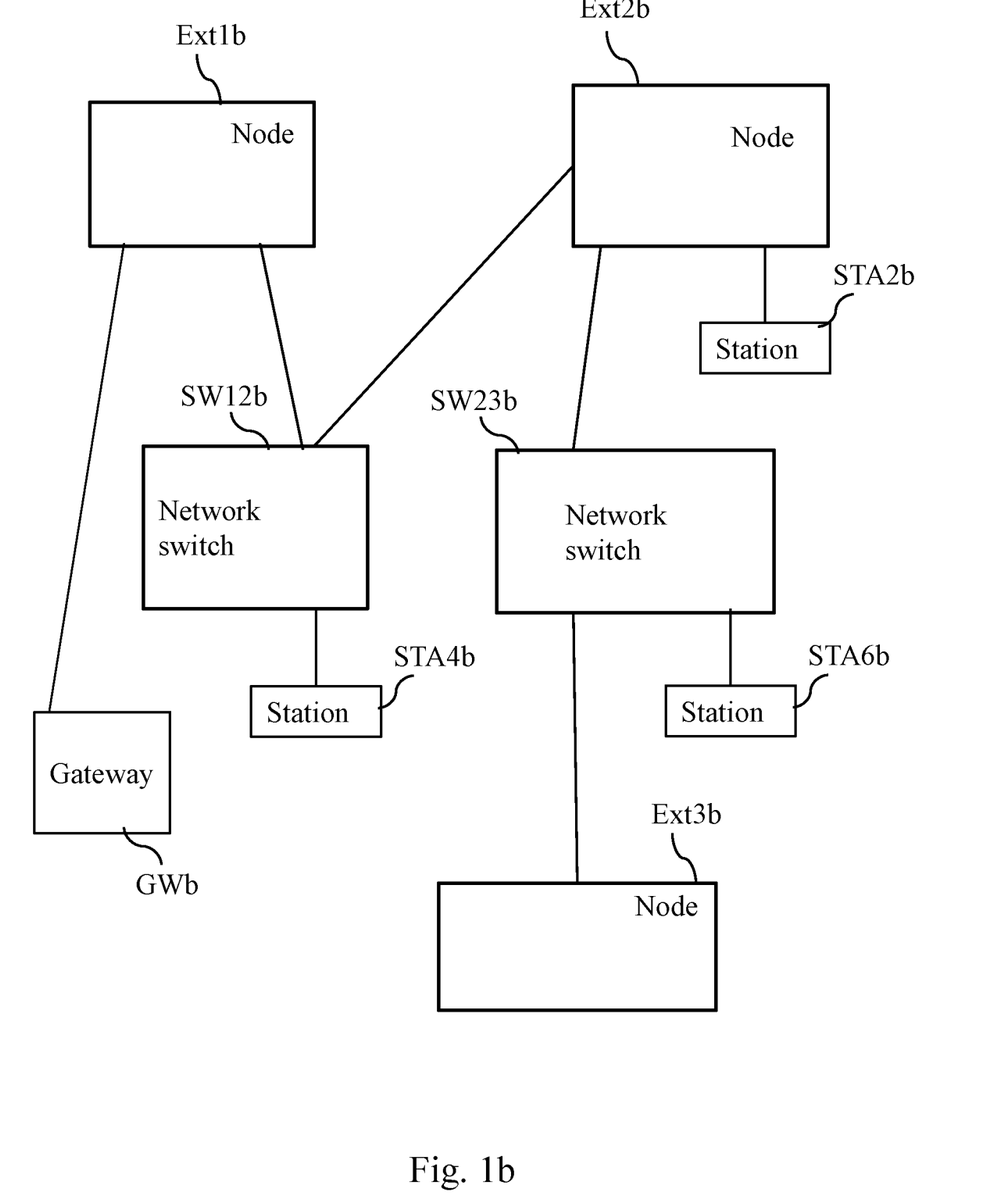
FIG. 1b illustrates schematically a second example of a local area network wherein the present invention is implemented.

FIG. 1b illustrates schematically a second example of a local area network wherein the present invention is implemented.

The local area network is constructed around a backhaul subnetwork comprising a set of interconnected nodes Ext1b, Ext2b and Ext3b. Each node Ext1b, Ext2b and Ext3b of the backhaul subnetwork comprises a plurality of radio interfaces:
- a radio interface known as "AP-BH" (standing for "Access Point Backhaul") corresponding to an access point interface of the backhaul subnetwork,
- an "ST-BH" (standing for "Station Backhaul") radio interface corresponding to a client interface of the backhaul subnetwork,
- an "AP-FH" (standing for "Access Point Fronthaul") radio interface corresponding to an access point interface of the local area network, this interface being dedicated to the association of stations or terminals.

In the context of Wi-Fi technology (registered trade mark), all these AP-FH access points thus use the same SSID identifier and the same password. The coverage area of the local area network thus formed around the wireless communication coverage extension system is then extended transparently for each terminal, or station, that connects thereto.

The nodes Ext1b, Ext2b and Ext3b of the backhaul subnetwork are connected to one another by means of a structure in tree form, a node then being able to serve as a relay between two other nodes of the backhaul subnetwork. The nodes Ext1b, Ext2b and Ext3b are thus interconnected by means of cable connections, for example of the Ethernet type, or wireless connections. The nodes Ext1b, Ext2b and Ext3b of the backhaul subnetwork thus communicate with one another by means of logic links, for example IP communications or encrypted tunnels or communications in accordance with a proprietary communication protocol. These logic links are established typically by means of probe and discovery messages.

By way of illustration, FIG. 1b shows that the node Ext1b is connected to a network switch SW12b, the node EXT2b is connected to a switch SW23b and to the switch SW12b, the node Ext3b is connected to the network switch SW23b, the node Ext1b is connected to a gateway GW1b for access to the internet.

A station STA2b is connected to the radio access point interface of the node Ext2b, a station STA6b is connected by a cable connection of the Ethernet type to the network switch SW23b and a station STA4b is connected by a cable connection of the Ethernet type to the network switch SW12b.

The wireless communication coverage extension system enables the stations STA2b, STA4b and STA6b to access the internet by means of the gateway GWb.

The stations are for example smartphones or a tablet, a computer, a television set, or a network attached storage (NAS).

The nodes of the backhaul subnetwork know the topology of the backhaul subnetwork and of the local area network by virtue of the analysis of the information that they have locally and the messages relating to the topology of the network that they receive from the other nodes.

Generally, the nodes use a bridge for connecting together the various interfaces of the backhaul and fronthaul networks. The bridge has an association table between each MAC address of an item of equipment and the physical interface or port to which the equipment is connected. All the items of equipment connected to the fronthaul interface of an access point are known.

In FIG. 1b, the station STA6b is not associated with a fronthaul interface. However, in the case of the station STA6b, the station STA6b being announced by the nodes Ext2b and Ext3ba connected to the network switch SW23b as being seen on one of their backhaul interfaces, the nodes Ext2b and Ext3b can deduce therefrom the presence of a network switch between them as soon as the station ST6b transmits data.

The station STA4b is not associated with a fronthaul interface. However, in the case of the station ST4b, the station STA4b being announced by the nodes Ext1b and Ext2b connected to the network switch SW23b as being seen on one of their backhaul interfaces, the nodes Ext2b and Ext3b can deduce therefrom the presence of a network switch between them as soon as the station ST4b transmits data.

Each node Ext1b to Ext3b can indicate its wireless communication coverage extension functionality in options included in a DHCP (the acronym for Dynamic Host Configuration Protocol) request. When an Ethernet cable connected to a network switch port SW23b is detected, the corresponding Ethernet interface is activated in the network switch SW23b. As long as a DHCP request with the option making it possible to identify the coverage extension functionality is not received, the Ethernet port can receive non-encrypted traffic coming from a station connected to the fronthaul. All the management traffic of the backhaul subnetwork is filtered on this port. This makes it possible to avoid broadcasting information in a non-secure manner to the station STA6a. As soon as a DHCP request with the option making it possible to identify the coverage extension functionality is received, a secure connection, called a tunnel, is established. In order to simplify the establishment of the tunnel, it is desirable to establish a permanent IP connection between the nodes Ext1b to Ext3b, independently of the presence of the gateway GWb. For example, a virtual local area network VLAN is created by each node, configured on a network different from the one used by the gateway GWb, by means of a DHCP server hosted by one of the nodes Ext1b, Ext2b or Ext3b, which is considered to be the master, and client DHCPs started up on each other node considered to be a slave, or in accordance with the protocol as defined in RFC 3927: Dynamic Configuration of IPv4 Link-Local Addresses.

For establishing the secure connection, encryption parameters are necessary. The generation and the storage of the encryption parameters are triggered at the time of the association or of the first communication of a node Ext1b to Ext3b with the local area network. Encryption information is generated for each pair of nodes, identified for example by their serial number. Thus a node can easily determine, by means of the serial number contained in a DHCP request, whether encryption information has already been generated between the node that sent the DHCP request and itself. The node that receives the DHCP request is at the initiative of the encryption parameter generation phase.

For example, in the case of use of a tunnel of the OpenVPN type, an open source VPN protocol that uses TLS/SSL (Secure Socket Layer) for establishing encrypted and authenticated internet connections between two machines, the SSL protocol relies on the use of asymmetric encryption keys. The two asymmetric keys offer the property that a message encrypted by one of the keys in the pair can be deciphered only by the second key in the pair, and vice versa. In addition, certificates are issued by certification authorities, and link the public key, the identity of the certification authority and the identity of the issuer of the public key.

Thus each node can start up a VPN server using its private key, an associated certificate, a root certificate that was used for encrypting it and its key. It can thus be client or server of an OpenVPN secure link with all the other nodes in the network.

The master node is for example determined as follows. The nodes, when they are added to the local area network, send a DHCP message such as DHCP DISCOVER and DHCP REQUEST, and indicate their coverage extension functionality and that they support the mechanism for electing the master node as well as the IP address of their VLAN.

If the gateway GWb does not implement the mechanism for electing the master node, when the gateway GWb receives the DHCP message, the gateway GWb ignores the coverage extension functionality without inserting in its DHCP OFFER and DHCP ACK responses the option indicating that it implements the coverage extension functionality. The newly added node thus knows that the gateway GWb does not support this election mechanism and starts up a DHCP relay mechanism in order to allow use thereof in the case of subsequent connection of other nodes. When another node is added to the local area network, the latter sends a DHCP message such as DHCP DISCOVER or DHCP REQUEST, which indicates its coverage extension functionality. The message is relayed by the previously added node to a DHCP server, which inserts in its response the option for identifying the coverage extension functionality, and starts up its tunnel server.

If the gateway GWb implements the mechanism for electing the master node, the message is received by the gateway GWb, which then inserts in the response information indicating its coverage extension functionality, activates its tunnel server and inserts, in a private option of the message, the IP address of its VLAN.

In the previously cited cases, if information indicating the coverage extension functionality is present, the node extracts, from the response, the IP address of the VLAN present in a private option of the message and starts up its client to establish a tunnel with the server having this IP address.

When at least two nodes are directly connected to a gateway GWb that does not implement the mechanism for electing the master node, they use an option in the DHCP packet located in the interval 224 to 254 reserved for a "private use". By sending in the DHCP requests an option 224 containing a predetermined value known to all the nodes, a node can identify another node having the coverage extension functionality as being the source of the request. The DHCP relay servers present on the nodes intercept the requests and change the content of the option. Thus, by modifying the content of the option 224 when the DHCP DISCOVER or REQUEST packets are relayed, a node can determine the presence of another node between it and the node that sent the DHCP request and activate its tunnel server.

It should be noted here that, alternatively to the DHCP, this discovery principle can be extended to all the discovery mechanisms such as DHCPv6, ICMPv6 as both defined by RFC 4861 (Neighbours Discovery), etc.

The tunnel is therefore configured on the VLAN using an IP network addressing different from that of the backhaul to guarantee permanent IP connectivity, independently of the various filtering rules that might be inserted. The traffic necessary for the operation of the tunnel does not pass directly through the bridges included in the nodes that do not learn the MAC addresses when the tunnel is established.

On each node at the ends of the tunnel, a virtual interface denoted tap0 is created for sending and receiving the encrypted data. These virtual interfaces are inserted in the backhaul bridge. This will create a loop between the two bridges, which are now connected directly via their backhaul conventional interfaces denoted eth0 and by the virtual interfaces tap0 of the tunnel.

For a tunnel between two nodes, one of which does not have a direct link with the gateway GWb providing access to the internet, the data on the non-protected interface eth0 of the two nodes are not transferred to the backhaul or the fronthaul.

Thus only the data coming from the tunnel are enabled to pass to the backhaul and the fronthaul and to join the local stack, which temporarily stores the data received and transmitted by the node. Likewise, all the data sent by the node must be sent in the tunnel.

For a tunnel between two nodes, one of which has a link with the gateway GWb, either directly or via a network switch, the Ethernet interface of the node connected to the gateway GWb will be used for routing the packets from the stations that are connected to it to the gateway GWb for an internet access. A bridge is configured with the same IP address as the one obtained on the Ethernet link and will be used for routing packets to the fronthaul and the backhaul of the node.

One or more nodes that detect a connectivity with the gateway GWb on an Ethernet interface, for example the nodes Ext1b or Ext2ab, eliminate the Ethernet interface from its bridge in order to use the bridge in a router function of the local area network, stop the client DHCP on the local area network bridge and create a new bridge directly on the Ethernet interface that was eliminated from the bridge. The IP address obtained is also configured on the local area network bridge, but without adding a route for the local area network in the routing table of the new bridge, which already contains a route making it possible to join the network from the new bridge via an Ethernet interface present on the bridge of the node Ext2b on which a connectivity with Ext1b called ext2tosw12 was detected. This interface allows the sending of data to Ext1b or the reception of data from Ext1b.

The route for joining the network with the IP address obtained via an interface br2 is inserted in an additional routing table. The additional routing table is a new table created for routing the data to the local bridge. The interface br2 is the local bridge of Ext2b created by a bridge management command that makes it possible to relay the data between the interfaces that it manages, to all the interfaces if the packet is broadcast to a broadcast address or to the port making it possible to join the destination MAC address.

In order to correctly route the packets to stations connected to the node, both on the backhaul and on the fronthaul, routing rules are added in order to use the additional routing table for the other node of the tunnel and the stations that are connected to the nodes of the fronthaul and backhaul networks.

The DHCP relay is started up between the local area network bridge and the interface br2 connected to the gateway GW, a DHCP relay is started up between the LAN bridge and the interface br2 connected to the gateway in order to enable the DHCP requests received on the interface br2 to be relayed to the gateway that could be joined via an interface called ext2tosw12 created for transmitting data to the other node of the tunnel.

The interface Br2 serves to route the data in the backhaul network and ext2osw12 serves to route the data to the gateway GW.

An ARP (the acronym for Address Resolution Protocol) proxy is created so that the node can respond to the ARP requests arriving on the interface ext2tosw12 to resolve the addresses present on the interface br2, and vice versa. Thus, on reception of an ARP request on the interface br2 for example, the ARP proxy will relay the request on the interface ext2tosw12 since this interface has an IP address belonging to the network configured on the interfaces br2 and ext2osw12 and, on reception of the response, will respond positively to the request on the interface br2.

Two filtering rules are also established so that DHCP packets relayed to the gateway GWa are not transmitted to the other node of the tunnel.

In this configuration, the stations STA4b and STA6b connected to a network switch cannot communicate with any other item of equipment, node, station or gateway of the local area network since it is not connected to a tunnel, the transmitted data being filtered.

It is possible to derogate from this rule by enabling one or more of the stations STA4b, STA6b to communicate partly or wholly with the equipment of the local area network, either in a predefined manner or by an action of the holder of the local area network by means of a graphical interface.

The nodes will detect the stations STA4b and STA6b as mentioned previously.

For example, the holder of the local area network can enable solely an access to the internet or enable access to the whole of the local area network.

For example, if the holder of the local area network enables solely access to the internet for the station STA6b, the present invention activates filtering rules at the node Ext2b to enable the traffic associated with the MAC address of the station STA6b to follow the outward and return path to enable it to join the gateway GWb. The present invention activates filtering rules at the node Ext1b connected to the gateway GWb, the outward and return path enabling it to join the gateway GWb and, if necessary, to block the transfer to any equipment that can be joined via the node Ext1b.

Figure 3A:
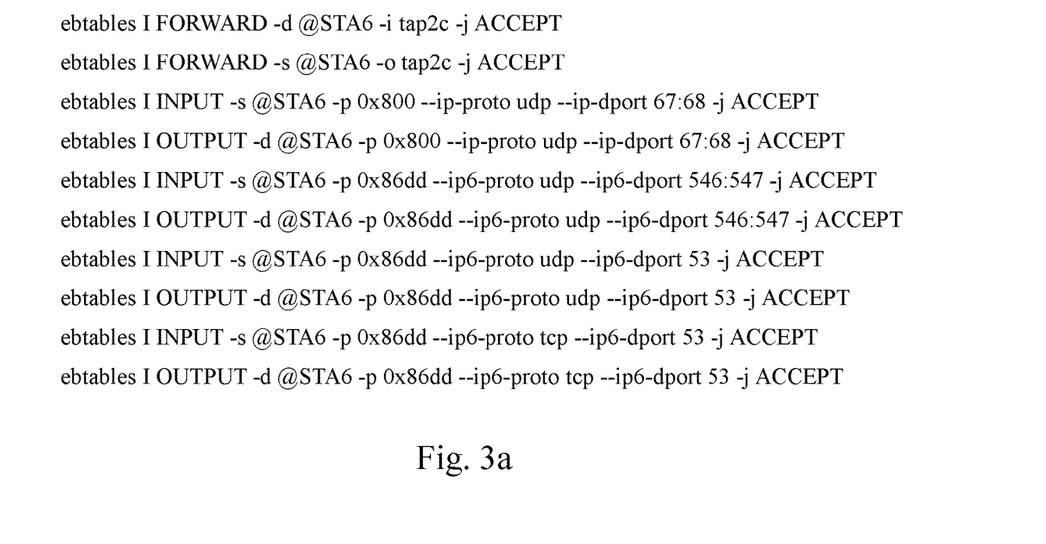
FIG. 3a illustrates an example of filtering rules applied to the node Ext2 when the station STA6b is enabled solely to access the internet.
Figure 3B:
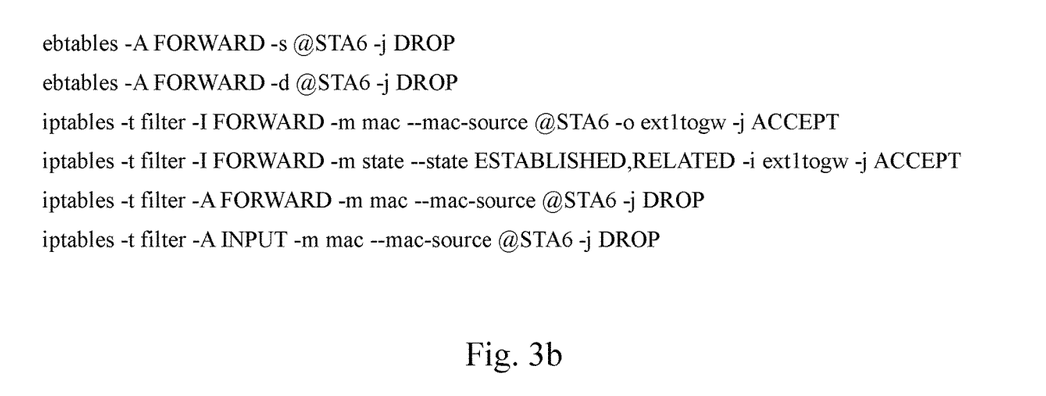
FIG. 3b illustrates an example of filtering rules applied to the node Ext1 when the station STA6b is enabled solely to access the internet.

An example of filtering rules is given in FIG. 3.

FIG. 3a illustrates an example of a filtering rule applied to the node Ext2 when the station STA6b is enabled solely to access the internet.

In FIG. 3a, @STA6 is the MAC address of the station STA6b, 67:68 is the IPV4 relay DHCP port, tap2 is the port of the bridge of the node Ext2, 546:547 is the IPV6 relay DHCP port, port 53 is the DNS port.

Ebtables is an example of a Linux command for configuring the filtering rules of a bridge.

FIG. 3b illustrates an example of a filtering rule applied to the node Ext1b when the station STA6b is enabled solely to access the internet.

In FIG. 3b, @STA6 is the MAC address of the station STA6b and ext1togw is the port allowing access to the gateway GW.

Iptable is an example of a Linux command for configuring the filtering rules applied to the routed data.

Figure 4A:
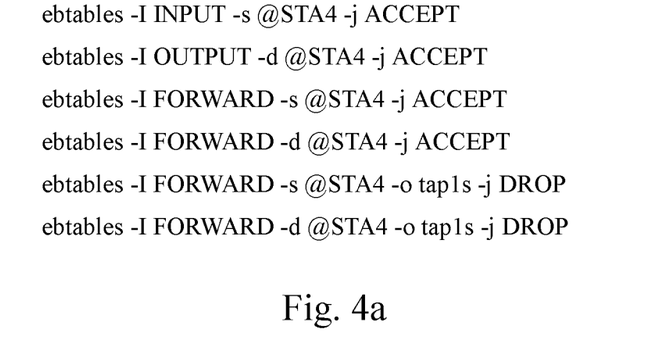
FIG. 4a illustrates an example of filtering rules applied to the node Ext1 when the station STA4b is enabled to access all the equipment in the local area network.
Figure 4B:
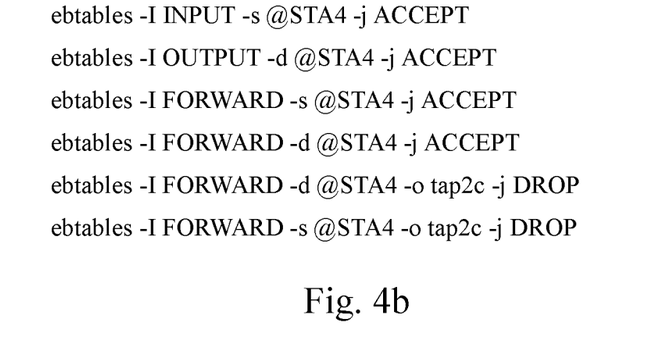
FIG. 4b illustrates an example of a filtering rule applied to the node Ext2 when the station STA4b is enabled to access all the equipment in the local area network.
Figure 4C:
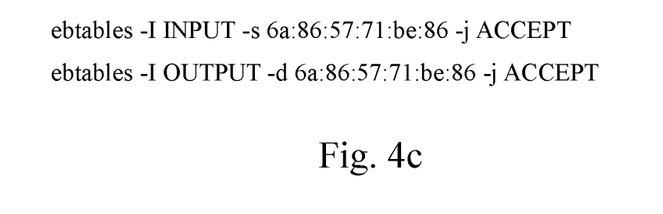
FIG. 4c illustrates an example of filtering rules applied to the node Ext3 when the station STA4b is enabled to access all the equipment in the local area network.

For example, if the holder of the local area network enables access to all the equipment in the local area network for the station STA4b, the present invention activates filtering rules for all the nodes in the network while avoiding recreating loops as previously described and preventing the transmission of data arriving from an item of equipment connected via a network switch to two nodes in the tunnel enabling these two nodes to communicate.

An example of a filtering rule is given in FIG. 4.

FIG. 4a illustrates an example of a filtering rule applied to the node Ext1b when the station STA4b is enabled to access all the equipment in the local area network.

In FIG. 4a, @STA4 is the MAC address of the station STA4b.

FIG. 4b illustrates an example of a filtering rule applied to the node Ext2b when the station STA4b is enabled to access all the equipment in the local area network.

In FIG. 4b, @STA4 is the MAC address of the station STA4b and tap2c is the port for sending secure data to the node Ext1.

FIG. 4c illustrates an example of a filtering rule applied to the node Ext3 when the station STA4b is enabled to access all the equipment in the local area network.

In FIG. 4c, @STA4 is the MAC address of the station STA4b.

Figure 2:
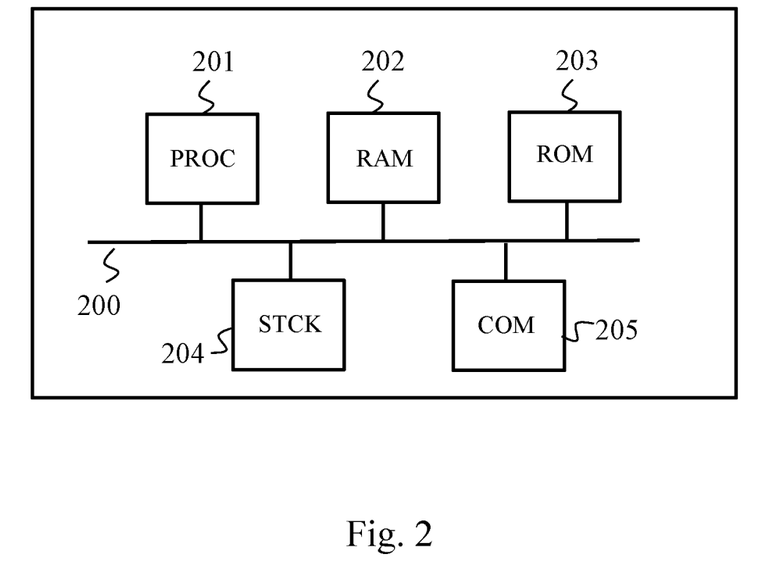
FIG. 2 illustrates schematically the architecture of a node wherein the present invention is implemented.

FIG. 2 illustrates schematically an example of hardware architecture of a node implementing the present invention.

According to the example of hardware architecture shown in FIG. 2, each node Ext1a, Ext2a, Ext3a, Ext1b, Ext2b, Ext3b then comprises, connected by a communication bus 200: a processor or CPU (central processing unit) 201; a random access memory RAM 202; a read only memory ROM 203; a storage unit such as a hard disk (or a storage medium reader, such as an SD (Secure Digital) card reader 204, at least one communication interface 205 enabling the node to communicate with the equipment in the local area network.

The processor 201 is capable of executing instructions loaded in the RAM 202 from the ROM 203, from an external memory (not shown), from a storage medium (such as an SD card), or from a communication network. When the node is powered up, the processor 201 is capable of reading instructions from the RAM 202 and executing them. These instructions form a computer program causing the implementation, by the processor 201, of all or part of the method described in relation to FIG. 5.

The method described below in relation to FIG. 5 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specified integrated circuit).

Figure 5:
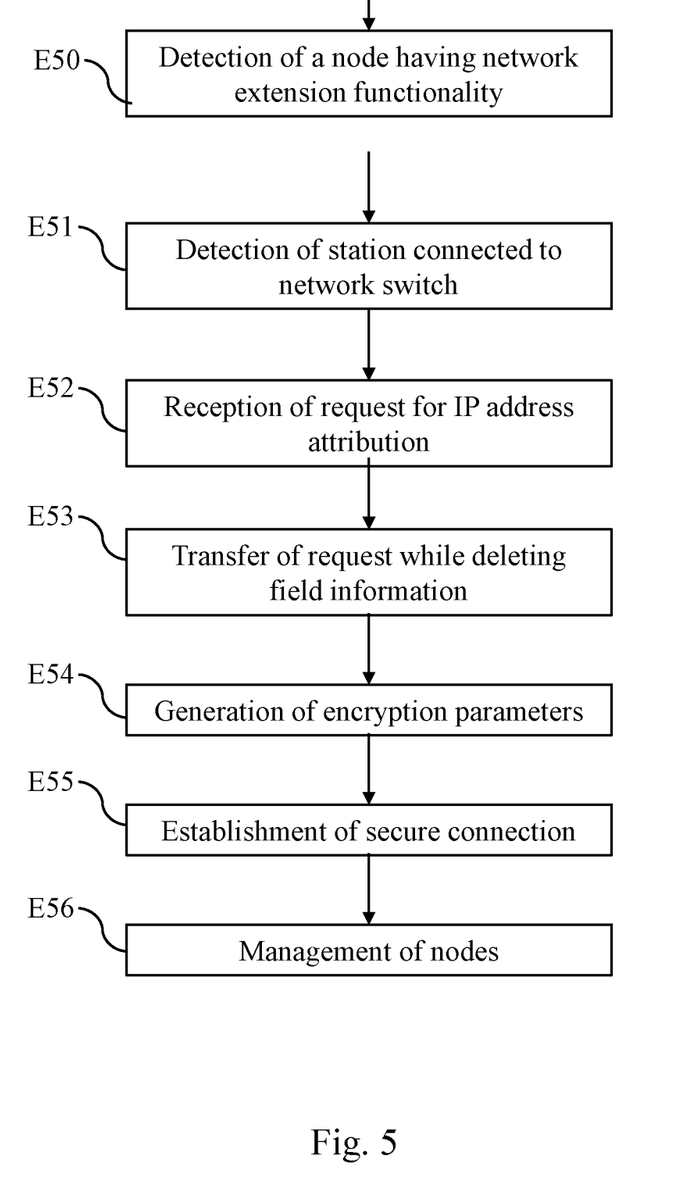
FIG. 5 illustrates an example of an embodiment.

In general, the node comprises electronic circuitry configured for implementing the methods described in relation to FIG. 5.

FIG. 5 illustrates an example of an embodiment.

At the step E50, information indicating that at least one node in the local area network has the coverage extension functionality is detected.

At the step E51, the connection of a station by means of a cable connection to a network switch is detected, said network switch being connected to the backhaul subnetwork by a cable connection.

At the step E52, a node receives a request for attributing an IP address, said request comprising in a field predetermined information known to the other nodes.

At the step E53, the node relays the request while deleting the field information.

At the step E54, the encryption information is generated.

At the step E55, the secure connections are established between each node if the connection of the station by means of a cable connection to the network switch is detected.

At the step E56, the nodes of the network connected to the network switch are managed with filtering rules applied to the data received by the nodes in order, for example, to eliminate loops generated by the creation of the secure connections and/or to enable the station connected to the network switch by means of the cable connection to access solely the internet by means of the gateway or to access the whole of the local area network.

Thus it is possible to guarantee the security related to the use of a network switch on the backhaul subnetwork while allowing the protection of the data, while keeping the possibility of connecting a station to the network switch and managing accesses of this station to the local area network.

In one example, the network switch is of the switch type and connects two nodes of the "extender" type. These extenders have "fronthaul" wireless capabilities enabling wireless equipment to connect to the local area network while extending the range of the local area network. The switch and the extenders are connected in cable mode (for example via Ethernet or powerline) to the backhaul or backhaul subnetwork of the local area network. When equipment, such as a station or an extender, is newly connected by cable to the switch, a detection of this new connection is effected, secure connections between the extenders connected to the switch are established, and a management of the extenders connected to the switch with filtering rules is implemented. It is then possible to make the connections between the extenders secure, while having the possibility of managing the extenders in order to enable the newly connected equipment to access the network, and for example to have a new fronthaul capability.

The invention claimed is:

1. A method for protecting a local area network comprising nodes allowing an extension of coverage of wireless communication in order to increase the range of the local area network by coordinating a plurality of access points integrated in the nodes, the nodes being interconnected by means of a backhaul subnetwork, each node of the backhaul subnetwork sending to at least one wireless network, called fronthaul network, wherein the method causing the device to perform:

detecting the connection of a station by means of a cable connection to a network switch included in the local area network, the network switch being connected to the backhaul subnetwork by a cable connection, establishing secure connections between each node if the connection of the station by means of a cable connection to the network switch is detected, managing the nodes connected to the network switch with filtering rules applied to the data received by the nodes.

2. The method according to claim 1, wherein, prior to the establishment of secure connections, the method causing the device to perform detecting, by a node, information indicating that at least one node of the local area network has the coverage extension functionality.

3. The method according to claim 1, wherein the local area network further comprises a gateway allowing access to the internet and, prior to the establishment of the secure connections, a permanent IP connection is established, the permanent IP connection being different from that used by the gateway.

4. The method according to claim 3, wherein, if at least two nodes are directly connected to the gateway and the gateway does not implement a master-election mechanism for attributing an IP address, the two nodes send requests for attributing an IP address by inserting in a field predetermined information known to the other nodes, the nodes relaying the requests while suppressing the field information.

5. The method according to claim 3, wherein the filtering rules applied to the data received by the nodes are applied for enabling the station connected to the network switch by means of the cable connection to access solely the internet by means of the gateway or to access the whole of the local area network.

6. The method according to claim 1, wherein a secure connection is established between each pair of nodes, the nodes in each pair of nodes generating encryption parameters for the secure communication.

7. The method according to claim 1, wherein the method causing the device to perform the step of suppressing each loop formed by the creation of a secure connection between two nodes and the connection previously used in the backhaul subnetwork between the two nodes.

8. A non-transitory storage medium that stores a computer program comprising instructions for implementing, by a node device, the method according to claim 1, when the program is executed by a processor of the node device.

9. A device for protecting a local area network comprising nodes allowing an extension of coverage of wireless communication in order to increase the range of the local area network by coordinating a plurality of access points integrated in the nodes, the nodes being interconnected by means of a backhaul subnetwork, each node of the backhaul subnetwork sending to at least one wireless network, called fronthaul network, wherein the device comprises:

means for detecting the connection of a station by means of a cable connection to a network switch, said network switch being connected to the backhaul subnetwork by a cable connection, means for establishing secure connections between each node if the connection of the station by means of a cable connection to the network switch is detected, means for managing the nodes connected to the network switch with filtering rules applied to the data received by the nodes.

* * * * *